United States Patent [19]

Black

[11] Patent Number: 4,876,792

[45] Date of Patent: Oct. 31, 1989

[54] CABLE STRIPPING DEVICE

[76] Inventor: Lin Black, SS #3, Site 13, Comp 39, Prince George, B. C., Canada, V2N 2S7

[21] Appl. No.: 280,448

[22] Filed: Dec. 6, 1988

[51] Int. Cl.4 .......................... B21F 13/00; B26B 27/00
[52] U.S. Cl. ........................................ 30/90.9; 30/90.3; 30/91.1
[58] Field of Search ...................... 30/90.2, 90.3, 90.9, 30/91.1, 91.2, 90.4; 81/9.42, 9.43, 9.44

[56] References Cited

U.S. PATENT DOCUMENTS

| 3,197,865 | 8/1965 | Bourdier | 30/90.9 X |
| 3,851,387 | 12/1974 | Ducret | 30/92.1 X |

FOREIGN PATENT DOCUMENTS

| 1000079 | 1/1957 | Fed. Rep. of Germany | 30/90.9 |
| 283893 | 11/1952 | Switzerland | 30/91.1 |

Primary Examiner—Douglas D. Watts
Attorney, Agent, or Firm—Spensley Horn Jubas & Lubitz

[57] ABSTRACT

A cable stripping device for removing armour from an armoured cable has a pair of rotatable cutter members mounted on a first support for rotation about parallel axes of rotation and in a common plane. The cutter members being spaced apart to receive the cable therebetween, and a pair of cable guides on a second support for guiding the cable between the cutter members, the cable guides being spaced apart to receive cable therebetween. The second support is movable relative to the first support to displace the cable guides against opposite sides of the cable and thereby to press opposite sides of the cable against the cutter members, which cut longitudinally along the cable and which rotate in the same direction so as to exert opposing forces on the cable.

9 Claims, 2 Drawing Sheets

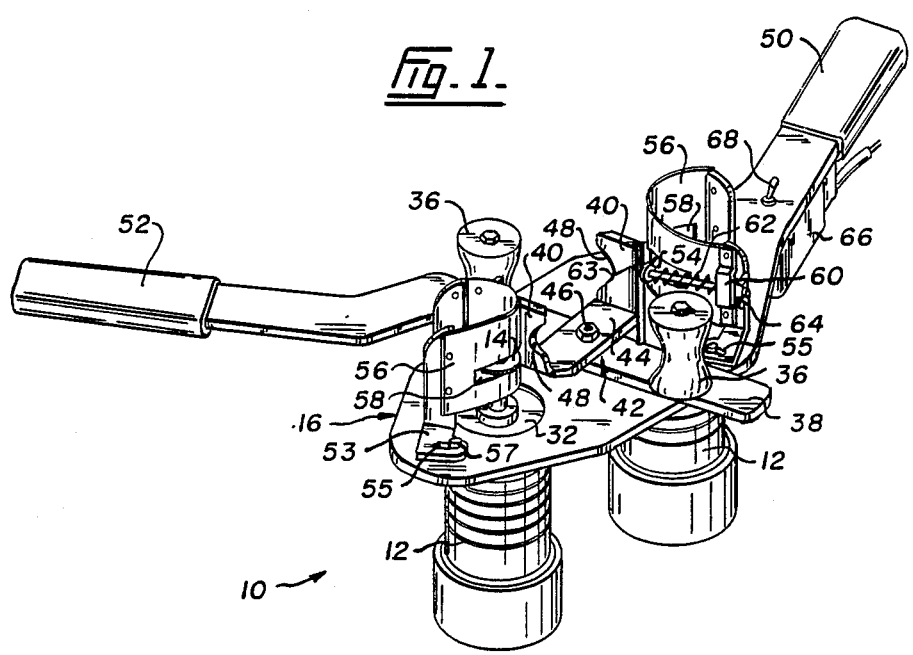
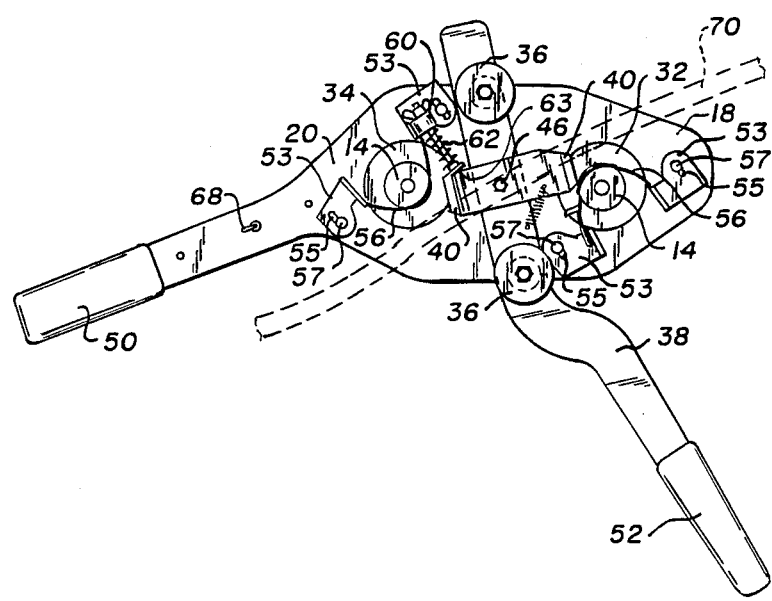

U.S. Patent    Oct. 31, 1989    Sheet 2 of 2    4,876,792
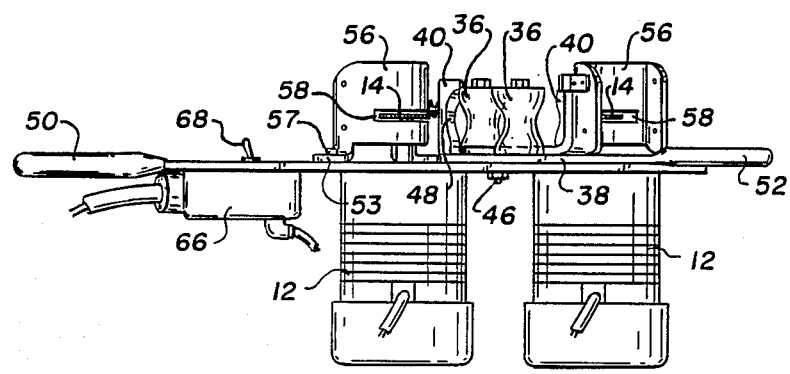
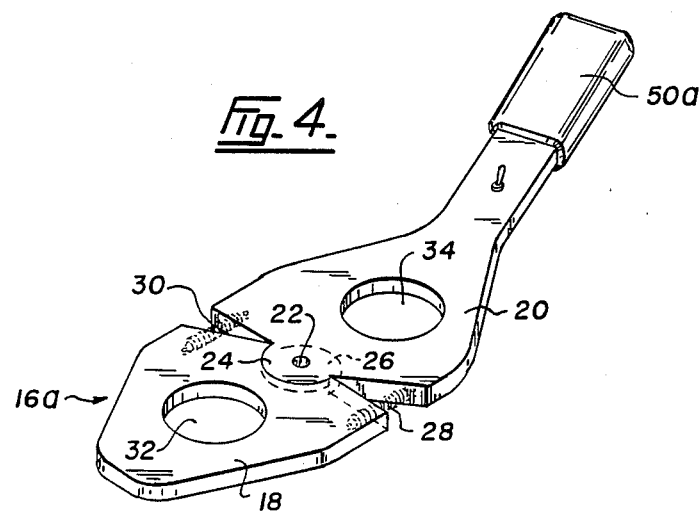

CABLE STRIPPING DEVICE

FIELD OF THE INVENTION

The present invention relates to a cutter device which is useful in particular, but not exclusively, for stripping metal armour from armoured cable, commonly known as teck plastic and cable, and which is also useful stripping the outer copper layer from cable comprising wire embedded in asbestos within an outer copper layer and commonly known as pyrotechnic cable and for salvaging the various materials contained in such cables.

BACKGROUND OF THE INVENTION

Various devices have, in the past, been proposed for removing an outer layer of armour or other material from a cable.

For example, the U.S. Pat. No. 2,502,656 discloses a cutting tool having a cutter rotatedly supported on a head and a housing supported the head for enclosing the cutting tool for use in cutting material of limited thickness.

U.S. Pat. No. 3,633,275 relates to a device for cutting conduct having a pair of jaws forming an open for receiving the conduct and a saw blade for cutting the conduct.

U.S. Pat. No. 3,959,877 discloses a portable tool for cutting the armour of a cable in a direction transverse to length of the cable.

U.S. Pat. No. 3,969,818 discloses a tool having a blade for cutting into the insulation of cable during rotation of the tool about the cable.

U.S. Pat. No. 4,062,110 shows a device having a single saw blade for cutting along the length of a cable and through the armour of the cable, as does U.S. Pat. No. 4,267,636.

BRIEF SUMMARY OF THE INVENTION

It is an object of the present invention to provide a novel and improved stripper for simultaneously cutting longitudinally along opposite sides of a cable or the like.

According to the present invention, there is provided a cable stripping device for removing armour from an armoured cable, comprising a pair of rotatable cutter members, cutter support means for supporting the cutter members for rotation about parallel axes of rotation and in a common plane, the cutter members being spaced apart to receive the cable therebetween cable between the cutter members; the cable guide means being spaced apart to receive the cable therebetween; and second support means for supporting the cable guide means. The means are provided for displacing the cable guide means against opposite sides of the cable to thereby press opposite sides of the cable against the cutter members, whereby the cutter members make longitudinal cuts along opposite sides of the cable.

BRIEF DESCRIPTION OF THE DRAWINGS

The invention will be more readily understood from the following description of a preferred embodiment thereof given, by way of example, with reference to the accompanying drawings, in which:

FIG. 1 shows a view in perspective of a cable stripping tool embodying the present invention;

FIG. 2 shows a plan view of the cable stripping tool of FIG. 1;

FIG. 3 shows a view inside elevation of the cable stripping tool of FIGS. 1 and 2; and FIG. 4 shows a view in perspective of a pair of support members forming components of a modification of the cable stripping tool of FIGS. 1 to 3.

DESCRIPTION OF THE PREFERRED EMBODIMENT

The cable stripping tool illustrated in FIGS. 1 to 3 the drawings is indicated generally by reference numeral 10 and comprises a pair of electric motors 12 for rotationally driving a pair of circular carbide cutter blades 14.

The motors 12 are mounted at the underside of a support, in the form of a metal plate, which is indicated generally by reference numeral 16.

The support 16 is formed with circular openings 32 and 34, through which electric motors 12 are connected to the cutter blades 14.

A pair of cable guide spools 36 are rotatably mounted, parallel to one another, on another support member 38, which is also pivotally secured to the support 16 by a bolt 46.

A further pair of cable guides 40 are formed by opposite ends of a metal strip indicated generally by reference numeral 42, which also has an intermediate portion 44, the cable guides 40 extending perpendicular to the intermediate portion 44 and the intermediate portion 44 being parallel to the supports 16 and 38 and also being pivotally connected thereto by the bolt 46, which is secured by nut 48 in threaded engagement with the bolt 46 at the underside of the support 16.

The cable guides 40 are formed with recesses 48, in opposite vertical edges thereof, for guidingly receiving opposite sides of the cable.

The supports 16 and 38 are formed with respective handles 50 and 52 which form handgrips by means of which the supports 16 and 38 may be pivoted towards one another, about the bolt 46, in order to urge the guide spools 36 against opposite sides of the cable and, thereby, to urge opposite sides of the cable against the cutter blades 14. During this pivotation, the cable guides 40 serve to retain the cable and to guide it into the Vee-shaped grooves of the guide spools 36.

In this way cutter blades 14 are caused to cut the cable longitudinally along lines of cut extending along opposite sides of the cable.

The depth of penetration of the cutter blades 14 is limited by cutter shields 56, which are formed of curved sheet metal with longitudinal slots 58 through which the peripheries of the cutter blades 14 project. Opposite ends of the shields 56 are fixed to mounting brackets 53, which are secured to the support 16 by bolts 57 extending through the brackets 53.

More particularly, the brackets 53 are formed with elongate openings or slots 55, through which the bolts 57 extend and which enable the brackets 53 to be adjusted in position relative to the bolts 57, upon slackening of the bolts 57, to thereby adjust the position of the shields 56 relative to their cutter blades 14 for adjusting the extent to which the blades 14 project through the slots 58.

A push rod 54 extends through a bracket 60 mounted on one of the shields 56 and is urged against the respective cable guide 40 by a compression spring 62 interposed between the bracket 60 and a head 63 formed on the push rod 54. A wing nut 64 in threaded engagement with the push rod 54 the push rod 54, in the bracket 60. The spring 62 thus serves to urge the cable guides 40 into snug engagement with the cable while also allowing the cable guides 40 to be displaced by the cable, when the latter is displaced by the guide spools 36, until the cable has been pressed against the shields 56 by the guide spools 36.

An electrical switch 66 is secured at the underside of the support member 20 and provided with an actuating knob 68, the switch 66 controlling the energization of the motors 12.

In use of this device, the handles 50 and 52 are spread apart to facilitate location of the cable in the cable guide recesses 48 as illustrated in FIG. 2, in which the cable is shown in broken lines and indicated by reference numeral 70.

The handles 50 and 52 are then pushed together, so that the guide spools 36 are moved into contact with, and press against, opposite sides of the cable.

The cable is thereby pressed against the cutter blades 14, which are rotated by actuation of the switch 66.

The cutter blades 14 and rotated in the same direction of rotation and, therefore, exert opposite forces on opposite sides of the cable. Consequently, these forces cancel one another, so that there is substantially no resultant pull exerted on the cable by the cutter blades 14.

It has been found in practice that, by this means, cable can be stripped at the rate of 60 feet per minute, which is considerably faster that the rates of cut commonly achieved in the past by the use of knives and hacksaws.

FIG. 4 shows a support indicated generally by reference numeral 16a, which is a modification of the support 16 of FIGS. 1 to 3. As can be seen from FIG. 4, the support 16a comprises two support members 18 and 20 of metal plate, which are pivotally secured together by means of the bolt 46, which extends through an opening 22 in semicircularly curved, mutually overlapping projections 24 and 26 of the support members 18 and 20.

A pair of helical springs 28 and 30 anchored to the undersides of the support members 18 and 20 serve to resiliently urge the support members 18 and 20 towards a normal position, relative to one another, about the bolt 46. This facilitates stripping of bent cable.

The above-described cutter devices embodying the present invention can readily operate on cables and the like of various diameters, without adjustment, and a large, mounted version of the present cutter device can readily be made for use, for example, in the salvage trade.

As will be apparent to those skilled in the art, modifications maybe made in the above described embodiment of the invention and, accordingly, the invention may be varied then the scope of the accompanying claims.

I claim:

1. A cable stripping device for removing armour from an armoured cable, comprising
a pair of rotatable cutter members;
cutter support means for supporting said cutter members for rotation about parallel axes of rotation and in a common plane;
said cutter members being spaced apart to receive said cable therebetween;
cable guide means for guiding said cable between said cutter members; and
means for displacing said cable guide means against opposite sides of said cable to thereby press opposite sides of said cable against said cutter members, whereby said cutter members make longitudinal cuts along opposite sides of said cable.

2. A cable stripping device as claimed in claim 1, further comprising guide support means for movable supporting said cable guide means relative to said cutter members, said guide support means inclining means connecting together said cutter support means and said guide support means support means for relative pivotal movement about an axis of pivotation parallel to the axes of rotation of said cutter members.

3. A cable stripping device claimed in claim 2, wherein said support means are each provided with a handgrip to facilitate manual pivotation of said support means about said axis of pivotation.

4. A cable stripping device as claimed in claim 1, further comprising cutter shield means for limiting displacement of said cable towards said cutter members and thereby limiting the depths of cut of said cutter means into said cable.

5. A cable stripping device as claimed in claim 4, further comprising means for adjusting the position of said cable shield means relative to said cutter members and thereby adjusting the depths of cut.

6. A cable stripping device as claimed in claim 2, wherein said cutter support means comprises a pair of support members respectively supporting said cutter members, and means connecting together said pair of support members for relative pivotation of said pair of support members about an axis of pivotation located between and extending parallel to the axes of rotation of said cutter members, whereby said cutter members are relatively displaceable to accommodate curves in said cable.

7. A cable stripping device as claimed in claim 6, further comprising spring means for resiliently urging said pair of support members into predetermined positions relative to one another.

8. A cable stripping device as claimed in claim 6, further comprising means for connecting together said cutter support means and said guide support means for relative pivotal movement about said axis of pivotation, the latter extending parallel to the axes of rotation of said cutter members and being located equidistantly between said cutter members.

9. A cable stripping device as claimed in claim 1, further comprising means for rotating said cutter members in the same direction, whereby said cutter members exert opposed longitudinal forces on said cable while cutting said armour.

* * * * *